Feb. 29, 1944. H. A. H. PRAY ET AL 2,343,225
METHOD OF APPLYING A PROTECTIVE COATING FOR METAL
Filed Jan. 18, 1940
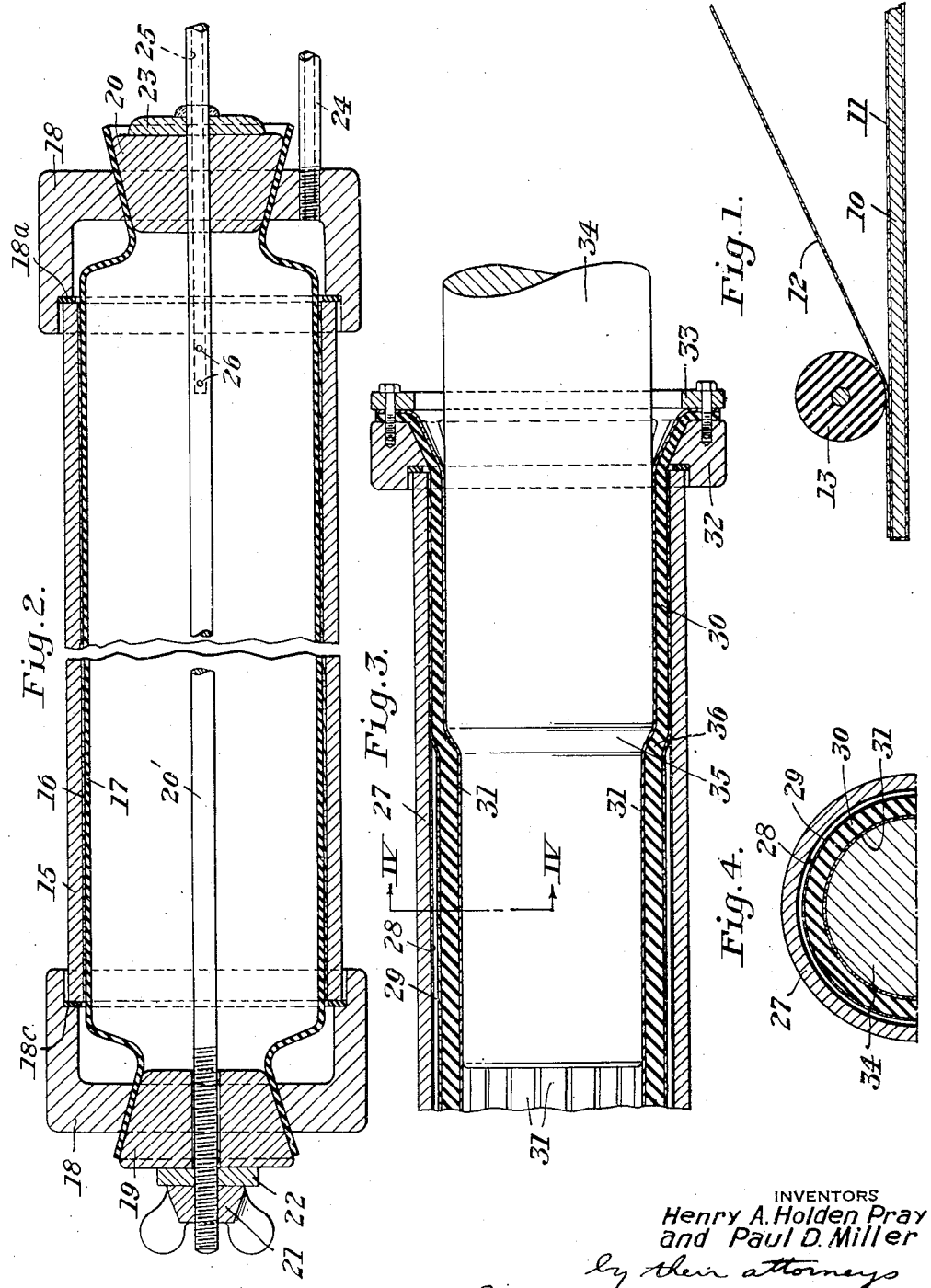
INVENTORS
Henry A. Holden Pray
and Paul D. Miller
by their attorneys
Stebbins, Blenko & Parmelee Patented Feb. 29, 1944

2,343,225

UNITED STATES PATENT OFFICE 2,343,225

METHOD OF APPLYING PROTECTIVE COATINGS FOR METAL

Henry A. Holden Pray and Paul D. Miller, Columbus, Ohio, assignors, by mesne assignments, to The Youngstown Sheet and Tube Company, Youngstown, Ohio, a corporation of Ohio Application January 18, 1940, Serial No. 314,472

2 Claims. (Cl. 154—2)

This invention relates to a method of applying protective coating for articles composed of material subject to deterioration as by corrosion.

The use of certain materials is considerably limited by their susceptibility to deterioration as by corrosion or the like and numerous efforts have been made heretofore to provide corrosion-resisting coatings for articles of such materials. Ferrous articles such as steel sheet, pipe, etc., are subject to corrosion by water and to an even greater extent by solutions of acids, alkalies or salts which must be handled in certain manufacturing operations. This has made it necessary to use stainless steel and non-ferrous materials and alloys in certain applications with a considerable increase in cost.

Various expedients have been resorted to heretofore to protect articles such as ferrous pipe or sheets from corrosion. Bitumastic or cementitious compositions have been employed as pipe linings, for example, but have not been found entirely satisfactory because of the thickness of the lining required to provide the desired protection and the relatively low resistance of such lining materials to attack by various chemicals.

We have invented a novel protective layer for material subject to corrosion and specifically ferrous articles such as steel sheet, pipe, etc., which overcomes the aforementioned objections and provides a thin continuous lining having high resistance to attack by corrosive chemicals.

In a preferred embodiment and practice of the invention, we coat the article to be protected with a layer of a synthetic resin as by spraying or brushing a solution thereof on the article or dipping it in the solution. After evaporation of the solvent, we apply a sheet of suitable material such as synthetic resin to the surface of the applied coating and press it thereon while heating the article sufficiently to effect softening of the resin coating and the formation of a bond between the sheet and the resin coating.

We are aware that it has been proposed heretofore to provide a protective surface for articles such as ferrous pipe by applying thereto a solution of synthetic resin and evaporating the solvent. Coatings produced in this way, however, are characterized by pores in the resin film resulting from the evaporation. Such pores preclude the production of a thoroughly corrosion-resistant coating. We are also aware that it has been proposed to extrude a tube of solid resin and expand it while heated within a pipe length to be lined. This process has only very limited application because of the difficulty of extruding a tube of solid resin.

The following detailed description and explanation of a preferred practice of the invention and certain modifications, refers to the accompanying drawing illustrating the process diagrammatically. In the drawing—

Fig. 1 is a section through an article having a protective coating applied thereto, showing one stage of the operation;

Fig. 2 is a longitudinal axial section through a tube having a lining applied therein and one form of apparatus for performing this operation;

Fig. 3 is a similar view showing a modified form of procedure; and

Fig. 4 is a partial transverse section along the line IV—IV of Fig. 3.

In the preferred practice of the invention, we apply to the surface of the article to be protected, a coating of a synthetic resin lacquer. The surface of the article should be clean and it may be subjected to any desired preliminary treatment necessary to produce this condition. The lacquer may be applied by spraying, dipping, brushing, or any other known method. Various kinds of lacquer may be employed and the degree of adhesion and flexibility desired in the finished coating as well as the nature of the surface sheet of resin to be finally applied are the determining factors in choosing the specific lacquer to be used. The lacquer coat serves as a primer and also as a binder for the final layer of sheet resin. It may be omitted in certain instances and the resin sheet applied directly to the metal surface.

After the application of the initial lacquer coat, the solvent is evaporated. This evaporation may be expedited by subjecting the coated article to a suitable heating or baking. When the lacquer has dried thoroughly leaving an adherent, resin coating, we apply thereto a sheet of synthetic resin of suitable thickness, i. e., between .001″ and .010″. The sheet resin must be thermoplastic and stable in the presence of heat up to the softening temperature. The sheet resin is pressed onto the surface of the resin coating while subjecting the article to heat sufficient to soften the sheet resin so that it forms a permanent bond with the resin coating. If the primer coating is omitted, the sheet is bonded directly to the metal surface. Pressure is applied to the sheet while heated in such manner as to avoid entrapment of air between the sheet and the resin coating. After the application of the resin sheet has been effected, the coated article may be subjected to a final heating at a temperature above the softening temperature of the sheet. On cooling of the article, it will be found that the coating is firmly bonded thereto and provides a surface layer which is highly resistant to corrosion.

To supplement the foregoing general description and explanation, we shall now describe briefly certain specific procedures which we have found to be successful.

Referring now particularly to Fig. 1, a panel 10 of mild steel about .032" thick is given a coating 11 of lead-stabilized vinyl lacquer by dipping it therein. The resin content of the lacquer is the result of the conjoint polymerization of a mixture of vinyl chloride and vinyl acetate. The lacquer coated panel is then baked for fifteen minutes in an oven at 350° F.

After removal from the oven, the lacquered panel is heated to about 300° F. and while at this temperature a sheet 12 of vinyl resin .005" thick is laid on top of the lacquer coating 11 and pressed thereon by means of a roll 13 of soft rubber. In applying the sheet 12, the necessary precautions are taken to avoid the entrapment of air bubbles between the sheet and the resin coating, e. g., by manipulating the sheet as shown in Fig. 1. The softening of the resin composing the sheet at the temperature to which the panel is reheated causes a firm bond to be formed between the sheet and the resin coating. After pressing the sheet 12 on the resin coating, the panel is then heated for about five minutes in an oven at about 350° F.

On testing the finished panel, it will be found that it can be bent through 180° around a ⅛" rod without cracking the applied coating. The coating may be cut with a sharp knife but cannot be peeled from the steel base, even at the bend, thus demonstrating fully the flexibility, extensibility and tight adherence of the coating. The corrosion-resistance of the coated panel has been proved by subjecting it to tap water, sea water, oil well brine, various acid solutions and other corrosive agents for substantial periods of time without the appearance of any sign of failure.

One method of procedure applicable to tubular articles such as pipe is illustrated in Fig. 2. A length of pipe 15 is coated on the inside with a stabilized vinylite resin lacquer 16 by filling the pipe and draining it. The pipe is then baked for fifteen minutes at 350° F. A sheet of solid vinyl resin .005" thick is cut to the proper size and inserted in the pipe. The width of the sheet is such that the edges thereof lap slightly and the lap of the sheet edges is located to coincide with the seam in the pipe which is a butt-welded tube. A liner comprising an inflatable sac 17 of rubber or similar material is then inserted in the pipe and end covers 18 having sealing gaskets 18a are disposed thereon. When inserted, the sac 17 is collapsed by means to be described shortly. Plugs 19 and 20 are inserted in the tapered holes in the end covers, a clamping rod 20' having a nut 21 thereon being then inserted through the plugs. When the nut 21 is tightened, a washer 22 and a collar 23 on the rod 20' seat the plugs tightly. The space between the sac 17 and the assembly of the pipe length and end covers is then evacuated through a connection 24. After evacuation of this space, fluid under pressure, e. g., air, is admitted through an axial bore 25 in the rod 20' and radial holes 26 therein. The connection thus provided to the interior of the sac also permits the initial collapsing to facilitate insertion into the pipe.

With a pressure of between five and twenty pounds per square inch maintained within the sac 17, the pipe is heated to a temperature of about 350° F. for several minutes, causing the resin coating and sheet lining to fuse and form a continuous, pore-free lining in the pipe.

The apparatus shown in Figure 2 is also disclosed and claimed in our divisional application, Serial No. 471,012, carved herefrom.

Fig. 3 illustrates a modified form of apparatus for forming a corrosion-resistant lining in a pipe. A pipe length 27 is coated with lacquer on the interior as at 28 by dipping it in a stabilized vinyl resin lacquer. The pipe is then baked for fifteen minutes at a temperature of 350° F. A sheet of vinyl resin 29 is then cut to size and inserted in the pipe. A liner in the form of a rubber tube 30 reinforced interiorly by flexible metal strips 31 is then inserted within the sheet lining, the rubber tube being secured at its end between clamping rings 32 and 33. An expander 34 having a shoulder 35 is then forced into the pipe 27 through the rings 32 and 33. The shoulder 35 as it advances through the pipe creates a traveling wave 36 in the section of the tube 30 and the resulting pressure forces the sheet lining firmly against the resin coating. The air between the sheet and the coating will normally be forced out by the expander. It may be desirable, however, to assist this evacuation of air by some means as described in connection with Fig. 2.

When the shoulder 35 of the expander 34 has reached the far end of the pipe, the pipe is subjected to a temperature of about 350° F. for several minutes, thereby fusing the sheet lining to the resin coating.

The finished article produced by either of the forms of apparatus shown in Figs. 2 and 3 is found to be characterized by qualities similar to those already described for the panel 10. In both cases, the sheet lining is firmly bonded to the resin coating without any air bubbles therebetween.

Numerous varieties of lacquers are suitable for the practice of the method herein described including those derived from resins of the following types: vinyl, urea formaldehyde, methyl, ethyl, propyl, butyl and iso-butyl methacrylate. The sheet resin may be of various types including plain or plasticized vinyl and acrylate resins.

It will be apparent that the invention is characterized by numerous important advantages. In the first place, it provides a firmly adherent, corrosion-resistant, and pore-free coating for articles subject to corrosion, viz., ferrous metal articles. The method of applying the coating is simple and relatively inexpensive and does not require any complex apparatus. The durability of the coating formed adapts the finished articles to a variety of uses where more costly materials have been necessary heretofore.

Although we have illustrated and described but a preferred method and apparatus for producing a protective layer, with slight modifications thereof, it will be understood that changes may be made in the procedure and apparatus employed without departing from the spirit of the invention or the scope of the appended claims.

We claim:

1. In a method of providing a hollow body with a protective lining, the steps including coating the interior of the body with a synthetic-resin lacquer, applying over said coating a sheet of thermo-plastic synthetic resin, inserting a temporary liner in the body and forcing into said liner a piston large enough to press the liner against the sheet and the sheet against said coating, while heating the sheet to its softening temperature.

2. In a method of providing a hollow body with a protective lining, the steps including coating the interior of the body with a synthetic-resin lacquer, applying over said coating a sheet of thermo-plastic synthetic resin, inserting a temporary liner in the body, securing the liner against movement longitudinally of the body, and forcing into said liner a piston large enough to press the liner against the sheet and the sheet against said coating, while heating the sheet to its softening temperature.

HENRY A. HOLDEN PRAY.
PAUL D. MILLER.